P. E. DAUBENSPECK.
CHAIN LINK.
APPLICATION FILED MAR. 10, 1920.
1,390,509.  
Patented Sept. 13, 1921.
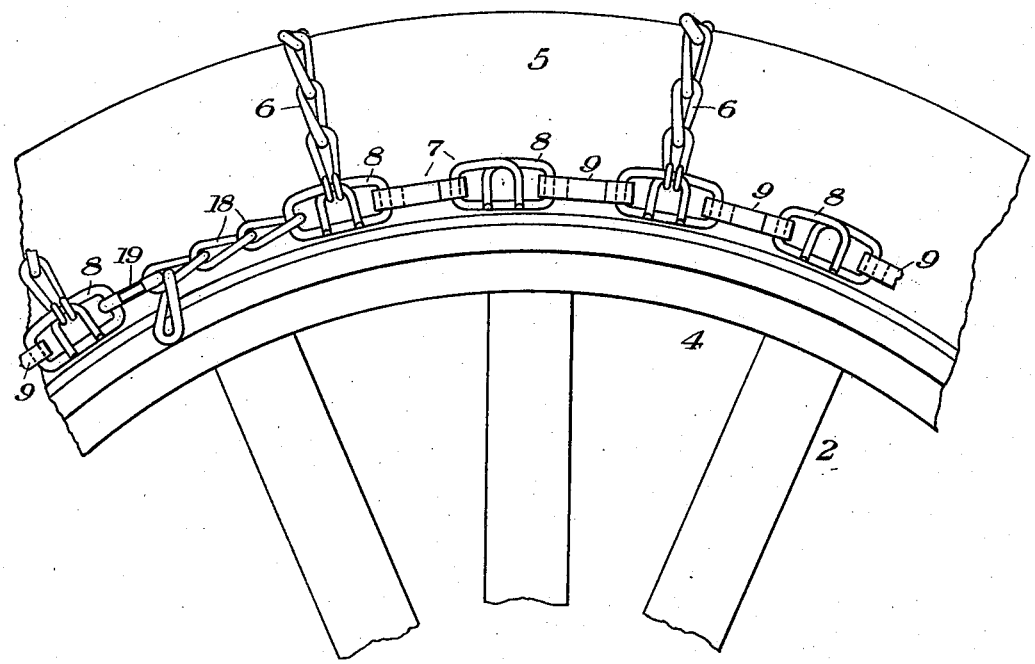

UNITED STATES PATENT OFFICE.

PETER E. DAUBENSPECK, OF BUTLER, PENNSYLVANIA.

CHAIN-LINK.

1,390,509.  Specification of Letters Patent.  Patented Sept. 13, 1921.

Application filed March 10, 1920. Serial No. 364,787.

*To all whom it may concern:*

Be it known that I, PETER E. DAUBENSPECK, a citizen of the United States, residing at Butler, in the county of Butler and State of Pennsylvania, have invented a new and useful Improvement in Chain-Links, of which the following is a full, clear, and exact description.

The present invention relates broadly to chain constructions and more particularly to links for use in grip treads or traction chains of the floating type.

The principal object of the present invention is to provide an improved link for use in the ordinary side chains.

Another object of the present invention is to provide such a link having a plurality of eyes providing ready means of attachment to the other links in the side chains and to the cross chains.

A further object of the invention is to provide a link of the character described having intermediate bracing members extending transversely of the link to materially strengthen the same.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

Figure 1 is a side elevation of a portion of a wheel having my improved chain applied thereto.

Fig. 2 is a detail view of one of the links.

Fig. 3 is an end view of the construction disclosed in Fig. 2, and

Fig. 4 is a view partly in section illustrating one manner of connecting the improved links.

In grip treads or traction chains of the floating type, it is desirable that means be provided for preventing rolling of the cross chains under tractive influences. This rolling may be effectively prevented by providing side links to which the cross chains are connected, which links are prevented from twisting or tilting while the wheel is in motion. The present invention provides a side chain constructed of links, by means of which the cross chains are held in the desired position at all times.

Referring more particularly to the drawings there is illustrated a portion of a wheel 2 having the usual felly 4 carrying a pneumatic or solid tire 5. Applied to the tire there is illustrated a floating chain of generally well known type comprising cross chains 6 and side chains 7. The side chains are preferably composed of my improved links 8 which may be connected by intermediate links 9 of any desired construction. In the preferred embodiment of my invention, the links 8 and 9 alternate throughout substantially the entire length of the side chains. In use, however, only alternate links 8 are adapted to be secured at one time to the cross chains 6, the remaining links 8 being utilized after the first set of cross chains has been worn out. Due to this construction, it will be apparent that the life of the entire chain is greatly increased, as heretofore the side chains have not been so constructed as to be capable of outwearing, to the required extent, the cross chains carried thereby.

Each of the links 8 is preferably constructed of a bar or rod of suitable material bent to provide a base 10 continuous throughout the length of the link. The ends of the rod or bar are then preferably bent upwardly to provide end portions 11 and top portions 12, each of the top portions extending substantially two-thirds of the length of an individual link. The extreme ends of the rod or bar are in turn bent downwardly to form braces 14 extending transversely between the top portions 12 and the base 10 and dividing the link into a central eye 15 and coöperating eyes 16 on each side thereof. It will be understood that at all points where the portions of the rod or bar overlap they may be spot-welded or brazed to provide a rigid structure.

In use, the central eye 15, provided with its double-bearing surface due to the overlapping of the top portions 12, is adapted to receive the end link of one of the cross chains 6. Due to the double wearing surface, the length of life of the central eye is sufficient, in ordinary use, to outwear a single cross chain. Adjacent links 8 may then be connected by the intermediate links 9 which are passed through the eyes 16. In the drawings, the intermediate links are illustrated as comprising flat strips of material bent to extend through the eyes 16 and then overlapped and welded at the points 17.

Flat links of this type have been found to effectively coöperate with the links 8 to prevent tilting or twisting of the same under tractive forces exerted through the cross-chains, and therefore keep the cross-chains from rolling. It will be obvious, however, that any desired type of intermediate links may be employed, such as the links 18 illustrated in engagement with the fastening device 19. This fastening device may, in turn, be of any well known construction, but is preferably of the type illustrated and claimed in my co-pending application Serial No. 1,367,241 filed Feb. 1, 1921.

I claim:

1. A tire chain for vehicle wheels, comprising side chains and cross chains, each of said side chains having a series of special links to which the ends of the cross chains are connected and intermediate links connecting the adjacent ends of the special links, said special links having a central eye provided with a double bearing surface for the cross chains, and having end eyes for the intermediate links, said eyes being separated by transversely extending bracing members connecting opposite sides of the special links to prevent distortion thereof and lying on opposite sides of the cross chains to hold the cross chains in central position with relation to the special links whereby twisting of the special links and rolling of the cross chains is prevented, substantially as described.

2. A tire chain for vehicle wheels, comprising side chains and cross chains, each of said side chains having a series of special links to which the ends of the cross chains are connected, and intermediate links connecting the adjacent ends of the special links, said special links having a central eye provided with a double bearing surface for the cross chains, and having end eyes for the intermediate links, said eyes being separated by transversely extending bracing members connecting the tops and bottoms of the special links to prevent distortion thereof, and lying on opposite sides of the cross chains to hold the cross chains in central position with relation to the special links whereby twisting of the special links and rolling of the cross chains is prevented, said bracing members being secured to the outside of the bottom of the special links whereby smooth surfaces are provided for engagement with the tire, substantially as described.

3. A tire chain for vehicle wheels, comprising side chains and cross chains, each of said side chains having a series of special links to which the ends of the cross chains are connected and intermediate links connecting the adjacent ends of the special links, said special links each comprising a bar of material bent to provide a base continuous throughout the length of the link, ends and top portions, the top portions extending substantially two-thirds of the length of each individual link and bent downwardly to form spaced braces extending between the top portions and base and dividing the link into a central eye and coöperating eyes on each side thereof, said top portions being overlapped to provide a double bearing surface for the central eye, and said braces being secured to the base to prevent distortion of the link, the cross chains being secured to said central eye whereby twisting of the special links and rolling of the cross chains is prevented, and the intermediate links being secured in said coöperating eyes for connecting the special links, substantially as described.

In testimony whereof I have hereunto set my hand.

PETER E. DAUBENSPECK.